UNITED STATES PATENT OFFICE.

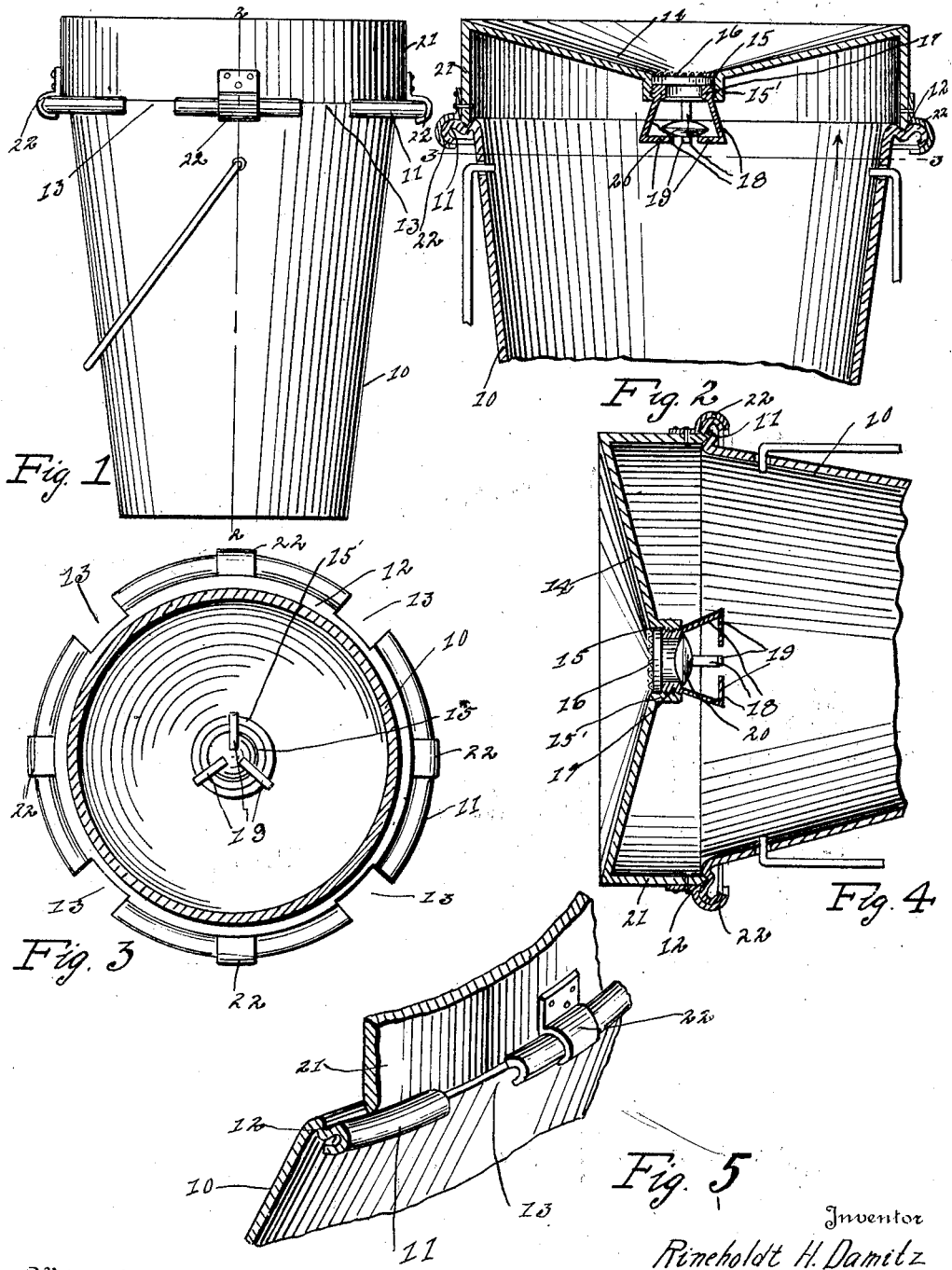

RINEHOLDT H. DAMITZ, OF KENNEDY, MINNESOTA.

MILK-PAIL.

1,327,704. Specification of Letters Patent. Patented Jan. 13, 1920.

Substitute for application Serial No. 179,264, filed July 7, 1917. This application filed June 17, 1919. Serial No. 304,952.

*To all whom it may concern:*

Be it known that I, RINEHOLDT H. DAMITZ, a citizen of the United States, residing at Kennedy, in the county of Kittson, State of Minnesota, have invented certain new and useful Improvements in Milk-Pails; and I do hereby declare the following to be a full, clear, and exact description of the invention, such as will enable others skilled in the art to which it appertains to make and use the same.

This invention relates to new and useful improvements in milk pails and particularly to non-spilling attachments therefor.

One object of the present invention is to provide a novel cover for a milk pail which will prevent the spilling of the milk should the pail be upset.

Another object is to provide a novel and improved device of this character having a novel straining cover and means for detachably securing the cover to the pail in a liquid-tight manner.

Other objects and advantages will be apparent from the following description when taken in connection with the accompanying drawing.

In the drawing:

Figure 1 is a side elevation of a milk pail made in accordance with the invention.

Fig. 2 is a vertical sectional view taken on the line 2—2 of Fig. 1, the lower portion of the pail being broken away.

Fig. 3 is a horizontal sectional view taken on the line 3—3 of Fig. 2 looking upwardly in the direction of the arrows.

Fig. 4 is a sectional view similar to Fig. 2, but which shows the pail in position on its side.

Fig. 5 is an enlarged fragmentary perspective view of the pail and cover showing the securing means for the cover.

Referring particularly to the accompanying drawing, 10 represents a milk pail, the upper edge of which is rolled, as shown at 11. Inwardly of the rolled edge the upper portion of the pail is formed with a circumferentially extending groove 12, and formed vertically through the rolled edge are the openings 13.

A cover is arranged to be disposed on the upper end of the pail, and said cover includes a basin-shaped upper wall 14, in the center of which is formed an opening 15. Secured in this opening and extending thereacross, is a wire screen 16, for straining the milk as it enters the pail from the cow.

Depending from the wall of the opening 15 is an internally threaded flange 15', and within this flange is screwed a ring 17. Formed integrally with the ring and depending below the opening 15, are the divergent arms 18, the lower ends of which have the inwardly directed lugs 19. Disposed between the said arms is a weighted disk 20, the same being arranged to move freely between the ring and the lugs, the disk resting on the ring and completely closing the straining opening when the pail is turned over or inverted, and normally resting on the lugs when the pail is in an upright position. Thus should the cow kick over the pail, the outlet will be closed and the milk prevented from spilling from the pail. It will be understood that the lugs are so spaced apart that the milk can readily pass the disk and enter the pail while milking.

The lower edge of the flange 21, which depends from the peripheral edge of the wall 14, of the cover, and forms a part of the cover, is arranged to be seated in the beforementioned groove 12, and is formed with a double bevel 21'. Secured to the outer face of the said flange and extending outwardly and downwardly therefrom, are the hook-shaped members 22, said members being arranged to be passed vertically through the openings 13, when the cover is placed in position on the pail, and to embrace the portions of the rolled edge 11 between the openings 13 when the cover is given a partial rotation on the pail. It will be noted that the outer curved portions of the hook members are tapered transversely so that when they engage with the rolled edge and the cover is partially rotated, a wedging action will be produced between the hooks and the rolled edge which will draw downwardly on the cover and firmly seat the beveled edge 21' in the groove 12. This will form a liquid-tight joint between the cover and the pail to prevent escape of milk should the pail be upset.

What is claimed is:

A milk pail including a receptacle, a cover for the receptacle including a basin-shaped upper wall having a central opening, the wall of the opening being extended downwardly to form a flange, a screen mounted in the opening, a ring engaged in said flange, depending divergent arms carried by the said ring, inwardly directed lugs carried by the lower portions of the arms, and a gravity disk disposed between the arms.

In testimony whereof I affix my signature in the presence of two witnesses.

RINEHOLDT H. DAMITZ.

Witnesses:
 ANDREW L. RYNNING,
 SWAN PEARSON.